United States Patent Office 3,613,439
Patented Oct. 19, 1971

3,613,439
APPARATUS AND METHOD FOR MEASURING NONUNIFORMITIES OF TRANSMISSIONS HAVING A SMALL TRANSMISSION RATIO
Karel Štěpánek, Prague, Czechoslovakia, assignor to Vyzkumny ustav obrabecich stroju a obrabeni, Prague, Czechoslovakia
Filed Apr. 21, 1969, Ser. No. 817,645
Int. Cl. G01m 13/02
U.S. Cl. 73—118     4 Claims

ABSTRACT OF THE DISCLOSURE

Nonuniformities of transmissions having a small transmission ratio are measured by converting the measurement to a measurement of two transmissions having a large transmission ratio by utilizing an auxiliary transmission having the same transmission ratio as that to be measured and by driving the transmission to be measured and the auxiliary transmission at a different speed from the transmission with a large transmission ratio. This provides two transmissions having large and equal transmission ratios. The difference in the measurement results is determined to eliminate the nonuniformities of the auxiliary transmissions and such difference indicates the nonuniformities of the transmission to be measured.

DESCRIPTION OF THE INVENTION

The present invention relates to the measurement of nonuniformities of transmissions having a small transmission ratio. More particularly, the invention relates to apparatus and a method for measuring nonuniformities of transmissions having a small transmission ratio.

The measurement of nonuniformities or inaccuracies of transmissions having a small transmission ratio such as, for example, a transmission ratio within the range of 1:8 and 8:1, generally provided with spur wheels, is very intricate in technique. The extent of the nonuniformity of the transmission depends upon the extent of the kinematic fault, which indicates deviations of the actual transmission ratio from an ideal transmission ratio of the same magnitude. The deviations are measured in angular seconds or in micrometers.

Actual methods of measurement of the nonuniformities of transmissions having small transmission ratios are based on magnetic, mechanical or optical principles. These methods have a number of shortcomings which prevent their widespread application.

The principal application of the measurement of nonuniformities of transmissions having a small transmission ratio is the measurement of the accuracy of toothed wheels or gears. The nonuniformities of the transmission ratio of a pair of meshing gears determines their inaccuracies. The measurement of inaccuracies of meshing gears by the measurement of nonuniformities of their transmission ratio is the most precise method and is generally known as the single flank rolling method. A more widespread application of this method of measurement of gears is presently prevented by imperfect component devices utilized in such method. The measuring apparatus actually used must comprise an ideal transmission having the same mean transmission ratio as the transmission to be measured in order to determine deviations of said transmission to be measured to said ideal transmission. Actually, this is accomplished so that the ideal transmission is represented by highly accurate gears or toothed wheels, friction rollers or a band transmission. Such measuring apparatus are not very accurate and are complicated. In addition, such measuring apparatus are unsuitable for universal application, since for different transmission ratios, the accurate gears or other components must be replaced by suitable gears or components.

The principal object of the present invention is to provide a new and improved method and apparatus for measuring nonuniformities of transmissions having a small transmission ratio.

An object of the present invention is to provide a method and apparatus for measuring nonuniformities of transmissions having a small transmission ratio within the range of 1:8 and 8:1.

An object of the present invention is to provide a method and apparatus for measuring nonuniformities of transmissions and having a small transmission ratio with accuracy, efficiency, effectiveness and reliability.

An object of the present invention is to provide a method for measuring nonuniformities of transmissions having a small transmission ratio, which method has few and simple steps.

An object of the present invention is to provide apparatus for measuring nonuniformities of transmissions having a small transmission ratio, which apparatus is of simple structure and low in cost.

An object of the present invention is to provide a method and apparatus for measuring nonuniformities of transmissions having a small transmission ratio by single flank rolling of gears with great accuracy, simple structure and applicability to different transmissions.

In accordance with the present invention, apparatus for measuring nonuniformities of transmissions having a small transmission ratio, each of which transmissions comprises a pair of meshed gears, comprises a first auxiliary transmission having a large transmission ratio. A second auxiliary transmission has the same transmission ratio as a transmission to be measured. The second auxiliary transmission comprises a pair of meshed gears. A first sensor in operative proximity with one of the gears of the second auxiliary transmission determines the rotary speed of the one of the gears. A second sensor in operative proximity with the other of the gears of the second auxiliary transmission determines the rotary speed of the other of the gears. A drive coupled to the transmission to be measured via the first auxiliary transmission drives both gears of the transmission to be measured and is coupled to the second auxiliary transmission via the first sensor for driving the second auxiliary transmission at the same speed as the first auxiliary transmission. A third sensor in operative proximity with one of the gears of the transmission to be measured determines the rotary speed of the one of the gears. A fourth sensor in operative proximity with the other of the gears of the transmission to be measured determines the rotary speed of the other of the gears. First determining means including the third sensor determines nonuniformities of the one of the gears of the transmission to be measured with the corresponding one of the gears of the second auxiliary transmission. Second determining means including the fourth sensing means determines nonuniformities of the other of the gears of the transmission to be measured with the corresponding other of the gears of the second auxiliary transmission. Difference means electrically connected to the first and second determining means determines the difference between the determinations provided by the first and second determining means. The difference indicates the nonuniformities of the transmission to be measured.

An adjustor coupled to the first sensor adjusts the determinations provided by the first and second determining means to an equal level. The adjustor comprises means for imparting to the second auxiliary transmission, independently from the transmission to be measured and the first auxiliary transmission, a slow oscillating movement. Voltage divider means adjusts the determinations to an equal level.

In accordance with the present invention, a method of measuring nonuniformities of transmissions having a small transmission ratio, comprises the steps of converting the measuring of nonuniformities of a transmission to be measured to the measuring of non-uniformities of two transmissions each having a large transmission ratio, and deriving the difference between the measurements of the nonuniformities of the two transmissions having large transmission ratios thereby indicating the nonuniformities of the transmission to be measured.

In order that the present invention may be readily carried into effect, it will now be described with reference to the accompanying drawings, wherein.

In the figures, the same components are identified by the same reference numerals.

Figure 1:
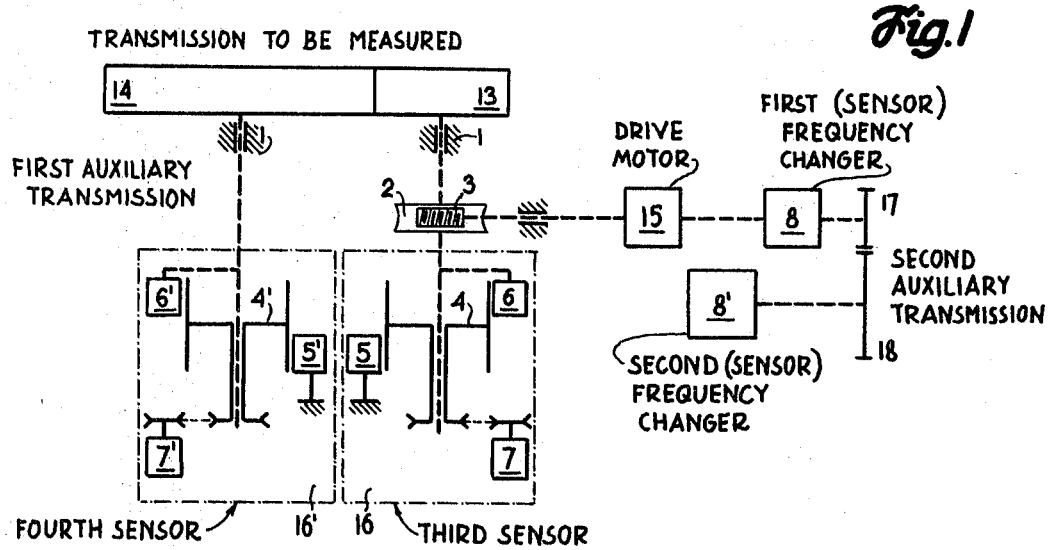
FIG. 1 is a schematic diagram of an embodiment of the apparatus of the present invention for measuring nonuniformities of transmissions having a small transmission ratio.

In FIG. 1, a pair of meshed gears or toothed wheels or spurs 13 and 14 have a small transmission ratio which is to be measured by the apparatus of the present invention. The gears 13 and 14 are rotatably supported by a frame 1 which supports the equipment of the embodiment of FIG. 1. The worm wheel 2 is affixed to the shaft of the gear 13. A worm 3 meshes with the worm wheel 2. The worm 3 is driven by an electric drive motor 15.

The drive motor 15 drives the worm 3 via a shaft extending through said drive motor and also drives a first sensor 8 via said shaft. The first sensor 8 comprises a first frequency changer of Selsyn type having a rotor affixed to the shaft driven by the drive motor 15. The first sensor functions to indicate the rotary speed of the driven shaft as a number of cycles. A second auxiliary transmission comprises a pair of meshed gears or spur wheels 17 and 18.

The gear 17 of the second auxiliary transmission is affixed to and driven by the shaft driven by the drive motor 15. A second sensor 8' is affixed to the shaft of the gear 18 of the second auxiliary transmission and rotates with said shaft. The second sensor 8' is identical with the first sensor 8, is connected in the same manner as said first sensor and functions in the same manner as said first sensor. The transmission ratio of the second auxiliary transmission 17, 18 is the same as that of the transmission 13, 14, to be measured. The gears 17 and 18 of the second auxiliary transmision are exchangeable in order to permit the measurement of transmissions having different transmission ratios.

Figure 2:
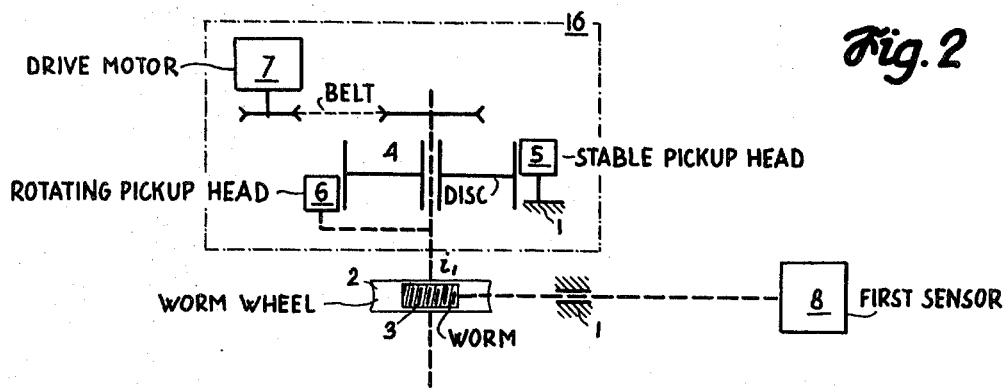
FIG. 2 is a schematic diagram of the third sensor of the embodiment of FIG. 1.

A third sensor or pickup 16 is provided in operative proximity with the shaft of the gear 13 of the transmission 13, 14 to be measured. A fourth sensor or pickup 16' is provided in operative proximity with the shaft of the gear 14 of the transmission 13, 14 to be measured. The third sensor 16 indicates the rotary speed of the shaft of the gear 13 and the fourth sensor 16' indicates the rotary speed of the shaft of the gear 14. As indicated, on an enlarged scale, in FIG. 2, a sensor which may be utilized either as the third sensor 16 or the fourth sensor 16' comprises a disc 4. The disc 4 is coaxially mounted around the shaft of the worm wheel 2 for free rotation about said shaft. The disc 4 is thus independently rotatable and is driven by an electric motor 7 via a belt transmission at uniform speed. A pair of smiilar magnetic tracks or paths or other suitable recording indicia such as, for example, optical record means, are provided on the disc 4. Each of the magnetic paths comprises an equal number of magnetic cycles, teeth or marks. Thus, for example, one of the magnetic paths or other indicating paths comprises Z5 cycles and the other of the paths comprises Z6 cycles equal in number to Z5. The number of cycles is equal to the transmission ratio $i$ of the transmission 13, 14 to be measured. That is, $Z5=Z6=i$.

A stable pickup head 5 is fixedly mounted on the frame 1 of the apparatus in operative proximity with one of the single paths on the disc 4. A rotating pickup head 6 is mounted on the shaft of the worm wheel 2 or on said worm wheel itself in operative proximity with the other of the signal paths on the disc 4. The first sensor 8 or the second sensor 8', may comprise any suitable rotating device for indicating the rotary speed of the shaft driven by the drive motor 15 (FIG. 1). Thus, a rotating frequency changer is suitable for use as each of the first and second sensors 8 and 8'. The rotating frequency changer has a stator having two separate windings supplied with electrical currents having a relative phase difference of 90°. Thus, a rotating magnetic field is generated in the stator of the rotating frequency changer. Currents induced in the rotor winding have a frequency which depends upon the rotary speed of the rotor.

Figure 3:
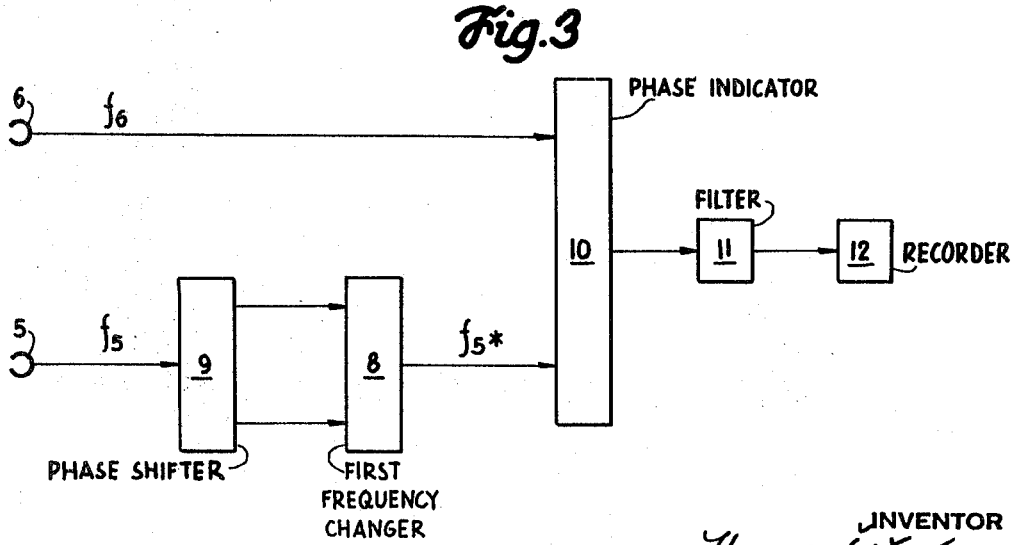
FIG. 3 is a block circuit diagram of the third sensor shown in FIG. 2.

FIG. 3 is an electrical block diagram of the third sensor 16. The fourth sensor 16', being identical with the third sensor 16, is not separately described. The rotating pickup 6 is directly connected to one input of a phase indicator 10. The stable pickup head 5 is directly connected to a phase shifter 9. The phase shifter 9 produces an output signal which is displaced 90° in phase from the input signal supplied thereto. The initial signal supplied from the stable pickup head 5 and the 90° phase-shifted signal are supplied to different inputs of the first frequency changer 8. In this case, the signal provided by the stable pickup head 5 is supplied to one stator winding of the first frequency changer 8 and the signal provided by the stable pickup head 5 after phase shifting by 90° is supplied to the other separate stator winding of said first frequency changer.

The output produced by the rotor of the first frequency changer 8 has a frequency $f5^*$ and is supplied to the phase indicator 10. The phase indicator 10 compares the phases of the signals from the rotating pickup head 6 and the rotor of the frequency changer 8. The resultant comparison or difference signal is supplied to a recorder 12 via a suitable filter 11. The filter 11 functions to eliminate or filter out higher harmonic frequencies. Each of the phase shifter 9, the frequency changer 8, the phase indicator 10, the filter 11 and the recorder 12 comprises any suitable circuitry or equipment for accomplishing the desired results.

When the drive motor 15 is at standstill, the worm wheel 2 is at standstill and signals having the following frequencies are induced in the stable and rotating pickup heads 5 and 6.

$$f5=(Z5)(n4)$$

$$f6=(Z6)(n4)=(Z5)(n4)$$

wherein Z5 and Z6 are the number of recorded cycles on the disc 4 and $n4$ is the number of revolutions or the rotary speed of said disc. The rotary speed of the disc 4 may be arbitrarily selected and may be, for example, 20 revolutions per second.

If the worm wheel 2 is rotated at $k2$ revolutions per second, the signals induced in the rotating pickup head 5 have a frequency $$f6=(Z6)(n4)\pm(Z6)(k2)$$

The plus or minus sign depends upon whether the worm wheel 2 and the rotating pickup head 6 are rotating in the same direction as or in the opposite direction from the disc 4.

If the worm 3, and thus the rotor of the rotating frequency changer 8, are at standstill, signals having the same frequency as those supplied to its stator are induced in its rotor. Thus, $$f5 = (Z5)(n4)$$

If the worm 3 and the rotor of the rotating frequency changer 8 are rotating at $k3$ revolutions per second, the signals induced in the rotor of said rotating frequency changer have a frequency $$f5^* = (Z5)(n4) \pm k3$$

The plus or minus sign 7 depends upon whether the rotor of the frequency changer 8 rotates in the same direction as or in the opposite direction from the direction of rotation of the electromagnetic field of the stator of said frequency changer.

Since, $$k3/k2 = i = Z5 = Z6$$

and $$k3 = (Z5)(k2)$$

then $$f5^* = (Z5)(n4) \pm (Z5)(k2) = (Z6)(n4) \pm (Z6)(k2) = f6$$

If the worm drive utilized with the apparatus is absolutely precise, the relation $$f5^* = f6$$

is true for both instantaneous and mean values of the frequencies, $f5^*$ and $f6$. If the worm transmission or drive is not precise, the relationship is only for the mean values of the frequencies $f5^*$ and $f6$. Due to a lack of precision of the worm transmission, the instantaneous values of the frequencies vary about their means values. Such variations result in phase deviations in such frequencies, which phase deviations are proportional to the nonuniformities of the transmission 13, 14 to be measured.

The phase deviations between the frequencies $f5^*$ and $f6$ are indicated by the phase indicator 10, as hereinbefore described. The phase differences or deviations are recorded by the recorder 12 after the higher harmonic frequencies are filtered out, as hereinbefore described. The phase difference or deviations recorded by the recorder indicate the extent of the nonuniformities of the transmission or the extent of its kinematic fault. The apparatus is therefore suitable for measuring nonuniformities of transmissions having a large transmission ratio.

The apparatus of the present invention, as shown in FIG. 1, comprises two arrangements for measuring transmissions having a large transmission ratio. The overall apparatus of the present invention functions to measure transmissions having a small transmission ratio. The first arrangement for measuring a transmission having a large transmission ratio utilizes the first and third sensors 8 and 16, respectively, to determine the nonuniformities D2, 3 of the worm transmission 2, 3. The second arrangement for measuring a transmission having a large transmission ratio utilizes the second and fourth sensors 8' and 16', respectively, to determine the nonuniformities of the entire apparatus. The nonuniformities of the entire apparatus include the nonuniformities D13, 14 of the transmission 13, 14 to be measured, the nonuniformities D2, 3 of the worm transmission 2, 3 and the nonuniformities D17, 18 of the second auxiliary transmission 17, 18. The nonuniformities of the second arrangement are thus $$D13, 14 + D2, 3 + D17, 18$$

If the transmission ratio of the second auxiliary transmission 17, 18 is the same as that of the transmission 13, 14 to be measured, then the transmission ratios of both arrangements for measuring transmissions having large transmission ratios are equal.

Figure 4:
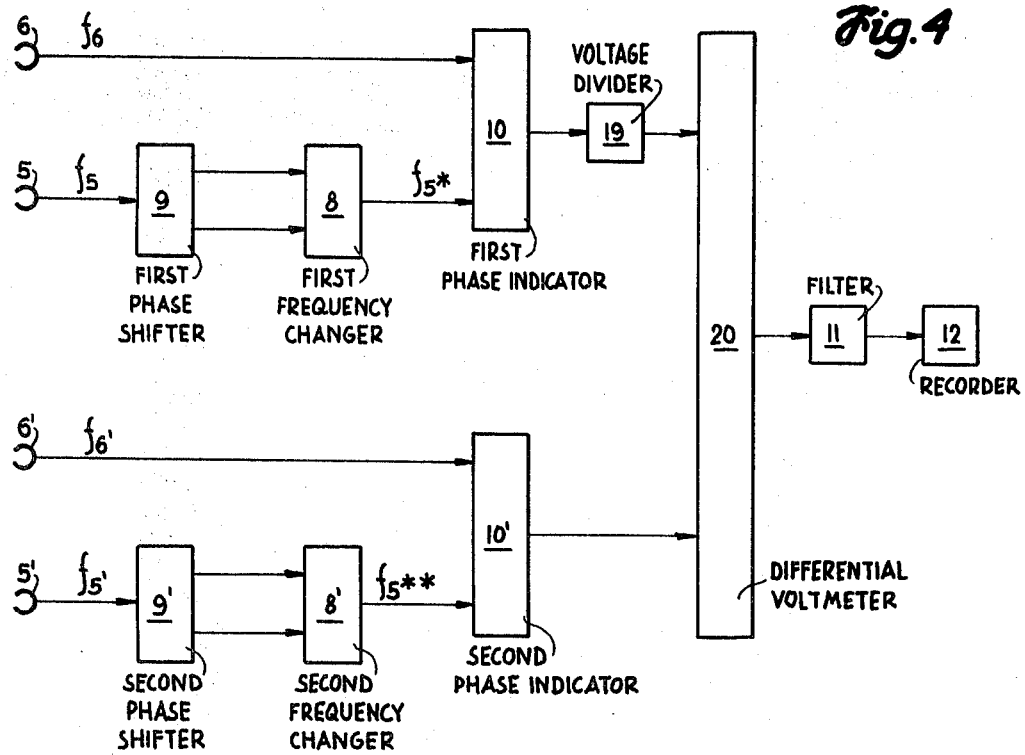
FIG. 4 is a block circuit diagram of the apparatus of the present invention as shown in FIG. 1.

FIG. 4 illustrates the circuit arrangement of the apparatus of the present invention in block form. In FIG. 4, the circuit of FIG. 3 is repeated twice. Instead of being connected to the recorder 12 via the filter 11, the output of the first phase indicator 10 is connected to an input of a differential voltmeter 20 via a voltage divider 19. The output of the differential voltmeter 20 is connected to the recorder 12 via the filter 11. The additional branch, representing the fourth sensor 16', is the same as that representing the third sensor 16. The rotating pickup head 6' supplies a signal having a frequency $f6'$ to one input of a second phase indicator 10. The stable pickup head 5' supplies a signal having a frequency $f5'$ to the input of a second phase shifter 9'. The signal having a frequency $f5'$ is supplied to one input of a second frequency changer 8' and the same signal, displaced 90° in phase, is supplied to the other input of the second frequency changer 8'.

The signal produced by the second frequency changer 8' has a frequency $f5^{**}$. The output signal of the second frequency changer 8' is supplied to the second input of the second phase indicator 10'. The output of the second phase indicator 10' is supplied to the second input of the differential voltmeter 20. The phase deviations or differences indicated by the first and second phase indicators 10 and 10' are directly proportional to the nonuniformities of the transmissions measured by the measuring arrangements of the apparatus.

The differential voltmeter 20 indicates the difference between the resultant values. The non-uniformities of the worm transmission 2, 3 may be subtracted from the difference. The nonuniformities of the second auxiliary transmission 17, 18 may be neglected since the result of the measurements is reduced by the transmission ratio of the worm transmission 2, 3. Therefore, after such eliminations, only the nonuniformities of the transmission 13, 14 to be measured remain. Thus, the difference between the determinations of the two arrangements indicates the nonuniformities of the transmission 13, 14 to be measured. This is expressed as $$D13, 14 + D2, 3 + D17, 18 - D2, 3$$
$$= D13, 14 + D17, 18 = D13, 14$$

In order to correctly eliminate the nonuniformities or inaccuracies of the worm transmission 2, 3, which nonuniformities are measured at a different rate than the nonuniformities of the transmission 13, 14 to be measured, the results must be adjusted in proportion to the measured transmission ratio. This is accomplished by the voltage divider 19 connected between the output of the first phase indicator 10 and the first input of the differential voltmeter 20. The voltage divider 19 functions to reduce the output of the first phase indicator 10 in the desired proportion relative to the output of the second phase indicator 10'.

Figure 5:
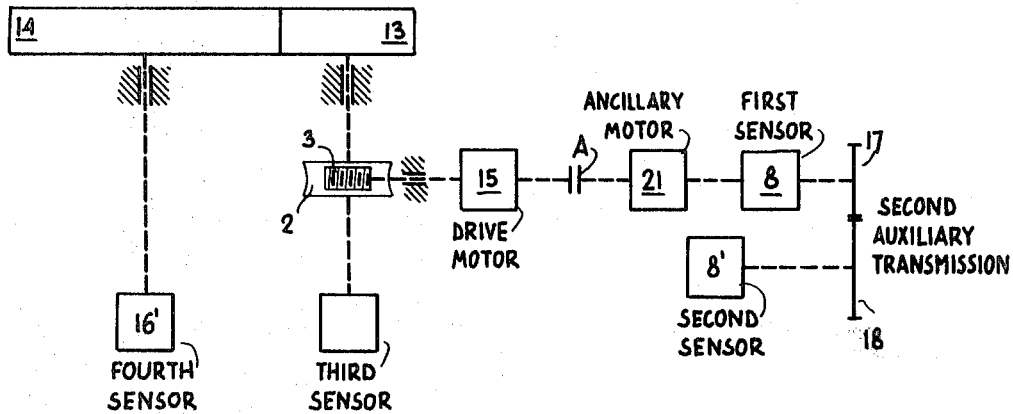
FIG. 5 is a schematic diagram of a modification of the apparatus of FIG. 1.

The proper adjustment of the voltage divider 19 may be acomplished by the apparatus of FIG. 5. In FIG. 5, the shaft of the worm 3 is coupled to the first sensor 8 via a coupling A. The coupling A permits the disconnected adjustment of the voltage divider 19. A slow oscillating movement is imparted to the first and second sensors 8 and 8' via an ancillary electric motor 21. The slow oscillating movement may be provided at, for example, one cycle per second at a deflection of 90° of the first sensor 8. The voltage divider 19 is adjusted during the course of the oscillating movement, so that the indications recorded in the recorder 12 are constant. This provides a proper or correct difference between both measuring arrangements and properly eliminates the nonuniformities of the worm transmission 2, 3.

While the invention has been described by means of a specific example and in a specific embodiment, I do not wish to be limited thereto, for obvious modifications will occur to those skilled in the art without departing from the spirit and scope of the invention.

What I claim is:

1. Apparatus for measuring nonuniformities of transmissions having a small transmission ratio, said transmissions each comprising a pair of meshed gears, said apparatus comprising a first auxiliary transmission having a large transmission ratio;

a second auxiliary transmission having the same transmission ratio as a transmission to be measured, said second auxiliary transmission comprising a pair of meshed gears corresponding to said transmission to be measured;

first sensing means in operative proximity with one of the gears of the second auxiliary transmission for determining the rotary speed of said one of said gears;

second sensing means in operative proximity with the other of the gears of the second auxiliary transmission for determining the rotary speed of said other of said gears;

driving means coupled to the transmission to be measured via said first auxiliary transmission for driving both gears of said transmission to be measured and coupled to said second auxiliary transmission via said first sensing means for driving said second auxiliary transmission at the same speed as said first auxiliary transmission;

third sensing means in operative proximity with one of the gears of the transmission to be measured for determining the rotary speed of said one of said gears;

fourth sensing means in operative proximity with the other of the gears of the transmission to be measured for determining the rotary speed of said other of said gears;

first determining means including said first and third sensing means for comparing the rotation of and determining nonuniformities of said one of the gears of the transmission to be measured with the corresponding one of the gears of said second auxiliary transmission:

second determining means including said second and fourth sensing means for comparing the rotation of and determining nonuniformities of said other of the gears of said transmission to be measured with corresponding other of the gears of said second auxiliary transmission;

difference means connected to said first and second determining means for determining the difference between the determinations provided by said first and second determining means, said difference indicating the nonuniformities of the transmission to be measured.

2. Apparatus as claimed in claim 1, further comprising adjusting means coupled to said first sensing means for adjusting the determinations provided by said first and second determining means to an equal level.

3. Apparatus as claimed in claim 2, wherein said adjusting means comprises means for imparting to said second auxiliary transmission, independently from the transmission to be measured and said first auxiliary transmission, a slow oscillating movement, and voltage divider means for adjusting said determinations to an equal level.

4. A method of measuring nonuniformities of test transmissions having a small transmission ratio, said method comprising the steps of simultaneously driving from said test transmission a first transmission having a high gear ratio relative to said test transmission and a second transmission having the same gear ratio as said test transmission measuring any nonuniformities between corresponding elements of the test transmission and said first and second transmission comparing the measuring of nonuniformities of said test transmission to the measuring of nonuniformities of said first and second transmissions; and deriving the difference between the measurements of the nonuniformities of the two transmissions having large transmission ratios thereby indicating the nonuniformities of the transmission to be measured.

References Cited
UNITED STATES PATENTS 3,462,607   8/1969   Heinz _____ 73—162 X JERRY W. MYRACLE, Primary Examiner U.S. Cl. X.R.

73—162